United States Patent
Gao et al.

(10) Patent No.: US 12,238,700 B2
(45) Date of Patent: Feb. 25, 2025

(54) SYSTEMS AND METHODS OF CONFIGURATION USING GROUP IDENTIFIERS

(71) Applicant: ZTE CORPORATION, Guangdong (CN)

(72) Inventors: Bo Gao, Shenzhen (CN); Zhaohua Lu, Shenzhen (CN); Yu Ngok Li, Shenzhen (CN); Huahua Xiao, Shenzhen (CN); Ke Yao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 482 days.

(21) Appl. No.: 17/487,730

(22) Filed: Sep. 28, 2021

(65) Prior Publication Data

US 2022/0022215 A1    Jan. 20, 2022

Related U.S. Application Data

(63) Continuation of application No. PCT/CN2019/080570, filed on Mar. 29, 2019.

(51) Int. Cl.
*H04W 72/1263* (2023.01)

(52) U.S. Cl.
CPC ................. *H04W 72/1263* (2013.01)

(58) Field of Classification Search
CPC .. H04B 7/0404; H04B 7/0691; H04B 7/0874; H04W 72/12633
See application file for complete search history.

(56) References Cited

U.S. PATENT DOCUMENTS

| | | | |
|---|---|---|---|
| 12,035,404 B2* | 7/2024 | Cirik | H04B 7/0695 |
| 2018/0048375 A1* | 2/2018 | Guo | H04B 7/024 |
| 2020/0053692 A1* | 2/2020 | Slanina | H04W 76/10 |
| 2020/0059951 A1 | 2/2020 | Frenne et al. | |
| 2020/0162133 A1 | 5/2020 | Harrison et al. | |
| 2021/0160880 A1* | 5/2021 | Zhang | H04L 5/0053 |
| 2021/0167831 A1* | 6/2021 | Zhang | H04B 7/0626 |

(Continued)

FOREIGN PATENT DOCUMENTS

| | | |
|---|---|---|
| CN | 109392110 A | 2/2019 |
| WO | WO-2018/143702 A1 | 8/2018 |

(Continued)

OTHER PUBLICATIONS

First Korean Office Action on KR Appl No. 10-2021-7034763, dated Jul. 3, 2023 (8 pages, including English translation).

(Continued)

*Primary Examiner* — Syed Ali

(74) *Attorney, Agent, or Firm* — Foley & Lardner LLP

(57) ABSTRACT

Systems and methods of configuration using group identifiers are provided. A wireless communication node or a wireless communication device can determine that signals to be communicated between the wireless communication device and the wireless communication node, are associated with a group identifier. The wireless communication node or the wireless communication device, responsive to determining that the signals are associated with the group identifier, can configure communication of the signals between the wireless communication device and the wireless communication node, without simultaneous communication of the signals.

17 Claims, 8 Drawing Sheets

(56) References Cited

U.S. PATENT DOCUMENTS

| | | | |
|---|---|---|---|
| 2021/0219129 A1* | 7/2021 | Liu | H04B 17/102 |
| 2021/0306964 A1* | 9/2021 | Yuan | H04L 5/0048 |
| 2021/0329625 A1* | 10/2021 | Wang | H04L 5/0091 |
| 2021/0392671 A1* | 12/2021 | Liu | H04L 5/0051 |
| 2022/0015118 A1* | 1/2022 | Park | H04W 72/20 |
| 2022/0039122 A1* | 2/2022 | Park | H04B 7/0695 |
| 2022/0060302 A1* | 2/2022 | Zhang | H04W 76/19 |
| 2022/0070855 A1* | 3/2022 | Zhang | H04W 72/51 |
| 2022/0085960 A1* | 3/2022 | Li | H04W 72/0446 |
| 2022/0109547 A1* | 4/2022 | Svedman | H04B 7/0626 |
| 2022/0158710 A1* | 5/2022 | Takano | H04B 7/0695 |
| 2022/0338227 A1* | 10/2022 | Cirik | H04W 72/53 |
| 2024/0349186 A1* | 10/2024 | Zhou | G06F 1/3209 |

FOREIGN PATENT DOCUMENTS

| | | |
|---|---|---|
| WO | WO-2018/227613 A1 | 12/2018 |
| WO | WO-2019/047953 A1 | 3/2019 |

OTHER PUBLICATIONS

Huawei et al., "Panel based UL beam selection", 3GPP TSG RAN WG1, Ad Hoc Meeting 1901, R1-1900844, Taipei, Jan. 12, 2019 (6 pages).

Vivo, "Discussion on Multi-Beam Operation," 3GPP TSG RAN WG1 Ad-Hoc Meeting 1901, R1-1900138, Taipei, Jan. 12, 2019 (10 pages).

International Search Report and Written Opinion for PCT Appl. No. PCT/CN2019/080570, mailed Jan. 3, 2020 (7 pages).

LG Electronics: "Feature lead summary of Enhancements on Multi-beam Operations" 3GPP TSG RAN WG1 Meeting #96; R1-1903686; Mar. 1, 2019; Athens, Greece (25 pages).

ZTE: "Enhancements on multi-beam operation" 3GPP TSG RAN WG1 Meeting #96; R1-1901635; Mar. 1, 2019; Athens, Greece (18 pages).

First Office Action for CN Appl. No. 201980094688.5, dated Oct. 14, 2022 (with English translation, 17 pages).

LG Electronics, "Feature lead summary of Enhancements on Multi-beam Operations" 3GPP TSG RAN WG1 Meeting #96, R1-1903244, Mar. 1, 2019, Athens, Greece (23 pages).

Extended European Search Report for EP Appl. No. 19923664.7, dated Mar. 16, 2022.

Lenovo et al., "Discussion of multi-beam operation" 3GPP TSG RAN WG1 #96, R1-1902162, Mar. 1, 2019, Athens, Greece (7 pages).

LG Electronics, "Updated feature lead summary of Enhancements on Multi-beam Operations" 3GPP TSG RAN WG1 Ad-Hoc Meeting 1901, R1-1901430, Jan. 25, 2019, Taipei, Taiwan (33 pages).

Lenovo et al., "Discussion on UL multi-panel transmission", 3GPP TSG RAN WG1 Ad-Hoc Meeting 1901, R1-1900388, Jan. 25, 2019, Taipei (8 pages).

Office Action for KR Appl. No. 10-2024-7009654, dated Aug. 20, 2024 (with English translation, 11 pages).

\* cited by examiner

SYSTEMS AND METHODS OF CONFIGURATION USING GROUP IDENTIFIERS

CROSS-REFERENCE TO RELATED APPLICATION

This application claims the benefit of priority under 35 U.S.C. § 120 as a continuation of PCT Patent Application No. PCT/CN2019/080570, filed on Mar. 29, 2019, the disclosure of which is incorporated herein by reference in its entirety.

TECHNICAL FIELD

The disclosure relates generally to wireless communications and, more particularly, to systems and methods for managing user device (UE) panels.

BACKGROUND

Beamforming technology uses multiple antennas to control the direction of a wave-front by weighting the magnitude and phase of individual antenna signals in an array of multiple antennas. In 5G New Radio (NR), analog beamforming is introduced into mobile communications for achieving the robustness of high frequency communications. The effectiveness of beam-forming operations depend at least in part on the effective operations of the user equipment (UE).

SUMMARY

The example embodiments disclosed herein are directed to solving the issues relating to one or more of the existing problems, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a wireless communication node and/or a wireless communication device includes: determining that signals to be communicated between the wireless communication device and the wireless communication node, are associated with a group identifier; and configuring, responsive to determining that the signals are associated with the group identifier, communication of the signals between the wireless communication device and the wireless communication node, without simultaneous communication of the signals.

In another embodiment, an apparatus comprising at least one processor and a memory, wherein the at least one processor is configured to read code from the memory and implement a method. The method includes determining that signals to be communicated between the wireless communication device and the wireless communication node, are associated with a group identifier; and configuring, responsive to determining that the signals are associated with the group identifier, communication of the signals between the wireless communication device and the wireless communication node, without simultaneous communication of the signals.

In yet another embodiment, a computer program product comprising a computer-readable program medium code stored thereupon, the code, when executed by at least one processor, causing the at least one processor to implement a method. The method includes determining that signals to be communicated between the wireless communication device and the wireless communication node, are associated with a group identifier; and configuring, responsive to determining that the signals are associated with the group identifier, communication of the signals between the wireless communication device and the wireless communication node, without simultaneous communication of the signals.

In one embodiment, a method performed by a wireless communication node and/or a wireless communication device includes: determining that signals to be communicated between a wireless communication device and a wireless communication node, are associated with a group identifier; and configuring, responsive to determining that the signals are associated with the group identifier, communication of the signals between the wireless communication device and the wireless communication node, to permit simultaneous communication of up to N of the signals, wherein N is a positive integer.

In another embodiment, an apparatus comprising at least one processor and a memory, wherein the at least one processor is configured to read code from the memory and implement a method. The method includes determining that signals to be communicated between a wireless communication device and a wireless communication node, are associated with a group identifier; and configuring, responsive to determining that the signals are associated with the group identifier, communication of the signals between the wireless communication device and the wireless communication node, to permit simultaneous communication of up to N of the signals, wherein N is a positive integer.

In yet another embodiment, a computer program product comprising a computer-readable program medium code stored thereupon, the code, when executed by at least one processor, causing the at least one processor to implement a method. The method includes determining that signals to be communicated between a wireless communication device and a wireless communication node, are associated with a group identifier; and configuring, responsive to determining that the signals are associated with the group identifier, communication of the signals between the wireless communication device and the wireless communication node, to permit simultaneous communication of up to N of the signals, wherein N is a positive integer.

In one embodiment, a method performed by a wireless communication node and/or a wireless communication device includes: determining that signals to be communicated between a wireless communication device and a wireless communication node, are each associated with a different group identifier; and configuring, responsive to determining that the signals are each associated with a different group identifier, an offset between transmissions of the signals to be larger than or equal to a defined value. In some embodiments, the different group identifiers of the signals include a first group identifier.

In another embodiment, an apparatus comprising at least one processor and a memory, wherein the at least one processor is configured to read code from the memory and implement a method. The method includes determining that signals to be communicated between a wireless communication device and a wireless communication node, are each associated with a different group identifier; and configuring, responsive to determining that the signals are each associated with a different group identifier, an offset between transmissions of the signals to be larger than or equal to a defined value. In some embodiments, the different group identifiers of the signals include a first group identifier.

In yet another embodiment, a computer program product comprising a computer-readable program medium code stored thereupon, the code, when executed by at least one processor, causing the at least one processor to implement a method. The method includes determining that signals to be communicated between a wireless communication device and a wireless communication node, are each associated with a different group identifier; and configuring, responsive to determining that the signals are each associated with a different group identifier, an offset between transmissions of the signals to be larger than or equal to a defined value. In some embodiments, the different group identifiers of the signals include a first group identifier.

In one embodiment, a method performed by a wireless communication node and/or a wireless communication device includes: determining that a signal to be communicated between a wireless communication device and a wireless communication node, is associated with a different group identifier from a default group identifier; and configuring, responsive to determining that the signal is associated with a different group identifier from a default group identifier, a scheduling offset between control signaling and the signal that is responsive to the control signaling to be larger than or equal to a defined value. In some embodiments, the default group identifier comprises a first group identifier.

In another embodiment, an apparatus comprising at least one processor and a memory, wherein the at least one processor is configured to read code from the memory and implement a method. The method includes determining that a signal to be communicated between a wireless communication device and a wireless communication node, is associated with a different group identifier from a default group identifier; and configuring, responsive to determining that the signal is associated with a different group identifier from a default group identifier, a scheduling offset between control signaling and the signal that is responsive to the control signaling to be larger than or equal to a defined value. In some embodiments, the default group identifier comprises a first group identifier.

In yet another embodiment, a computer program product comprising a computer-readable program medium code stored thereupon, the code, when executed by at least one processor, causing the at least one processor to implement a method. The method includes determining that a signal to be communicated between a wireless communication device and a wireless communication node, is associated with a different group identifier from a default group identifier; and configuring, responsive to determining that the signal is associated with a different group identifier from a default group identifier, a scheduling offset between control signaling and the signal that is responsive to the control signaling to be larger than or equal to a defined value. In some embodiments, the default group identifier comprises a first group identifier.

In one embodiment, a method performed by a wireless communication node and/or a wireless communication device includes: determining that signals to be communicated between a wireless communication device and a wireless communication node, are associated with a group identifier; and applying, responsive to determining that the signals are associated with the group identifier, at least one large scale parameter associated with the group identifier to the signals.

In another embodiment, an apparatus comprising at least one processor and a memory, wherein the at least one processor is configured to read code from the memory and implement a method. The method includes determining that signals to be communicated between a wireless communication device and a wireless communication node, are associated with a group identifier; and applying, responsive to determining that the signals are associated with the group identifier, at least one large scale parameter associated with the group identifier to the signals.

In yet another embodiment, a computer program product comprising a computer-readable program medium code stored thereupon, the code, when executed by at least one processor, causing the at least one processor to implement a method. The method includes determining that signals to be communicated between a wireless communication device and a wireless communication node, are associated with a group identifier; and applying, responsive to determining that the signals are associated with the group identifier, at least one large scale parameter associated with the group identifier to the signals.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

A. Networking Environment and Overview

Figure 1:
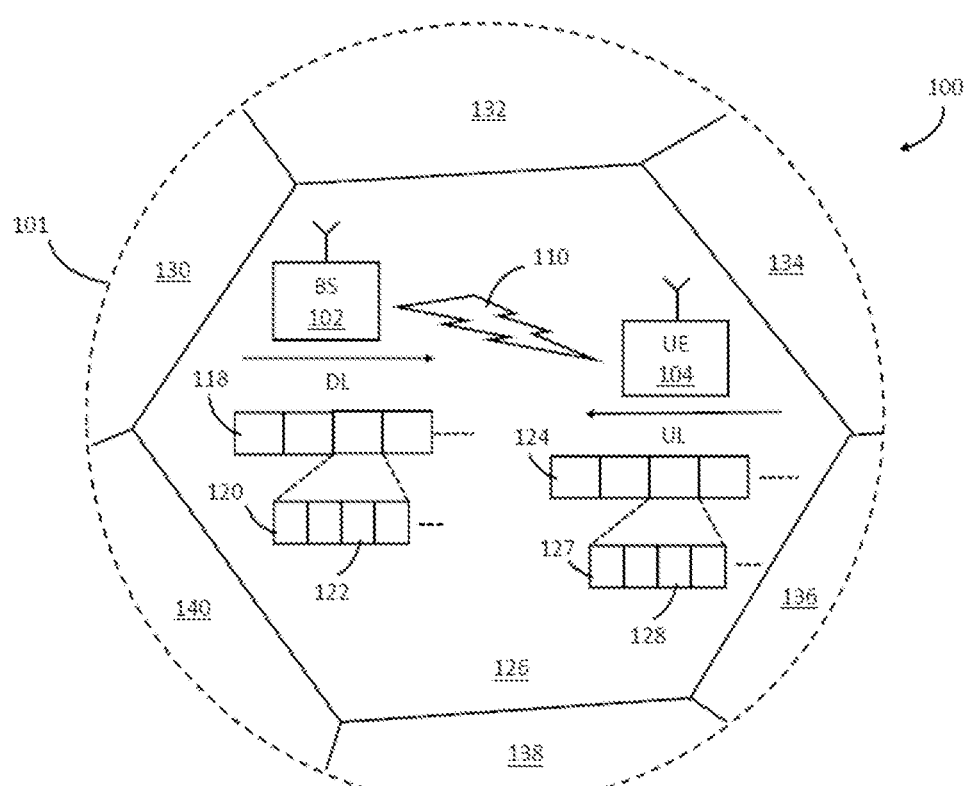
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are respectively described herein as non-limiting examples of "communication node" (or "wireless communication node") and "communication device" (or "wireless communication device") generally, which can practice the methods disclosed herein. Such communication nodes and devices may be capable of wireless and/or wired communications, in accordance with various embodiments of the present solution.

Figure 2:
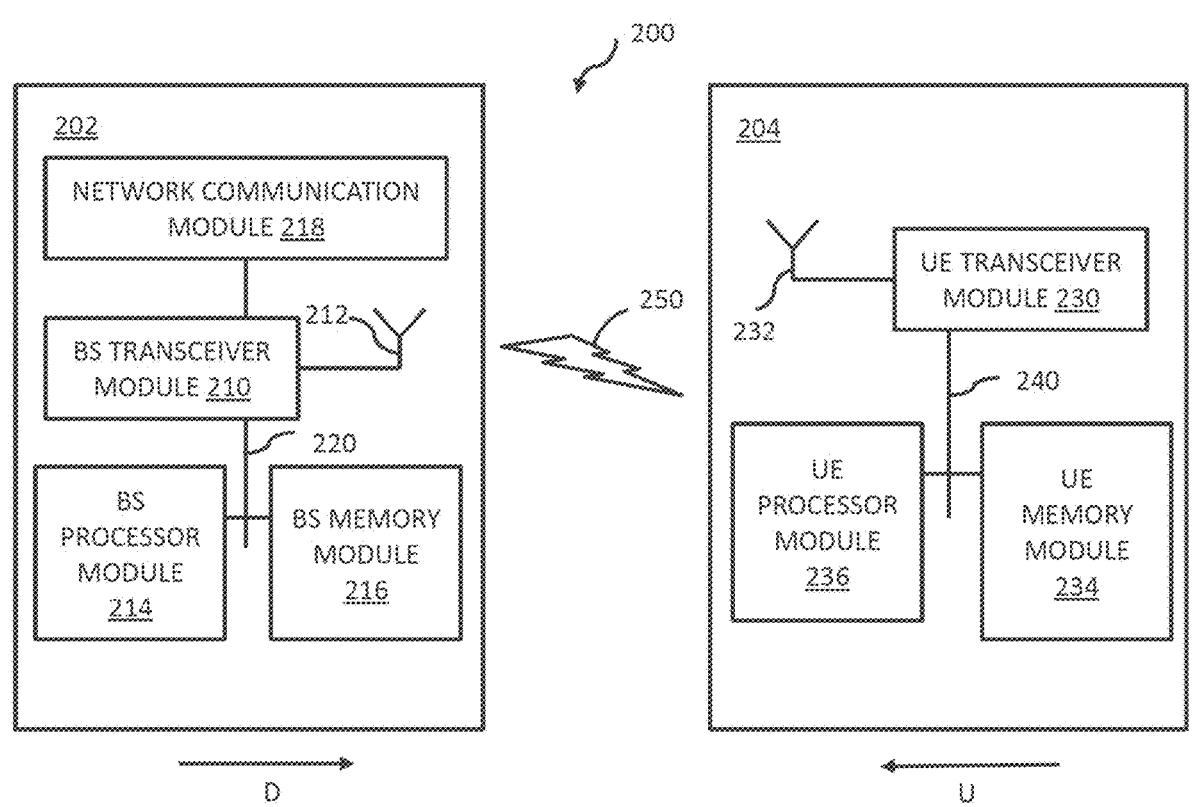
FIG. 2 illustrates block diagrams of an example base station and an example user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be a next generation nodeB (gNodeB or gNB), an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a process, method, or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Having discussed aspects of a networking environment as well as devices that can be used to implement the systems, methods and apparatuses described herein, additional details shall follow.

At the expense of wide or ultra-wide spectrum resources, the considerable propagation loss induced by extremely high frequency communications becomes a challenge. To solve this problem, antenna array and beam-forming training technologies using massive multiple-input and multiple-output (MIMO) (e.g., up to 1024 antenna element for one node) have been adopted to achieve beam alignment and to obtain sufficiently high antenna gain. To keep to a low implementation cost while utilizing an antenna array, analog phase shifters become a useful solution for implementing millimeter wave beam-forming, which means that the number of phases is finite and the constant modulus constraints are placed on these antenna elements. In some embodiments, given pre-specified beam patterns, beam-forming training that is variable-phase-shift-based aims to identify the best or ideal pattern for subsequent data transmission, generally in the one-transmission point (TRP) (e.g., a base station, a next generation nodeB (gNB)) and one-panel case.

The present disclosure takes the position that the multi-TRP and multi-panel cases should be considered for 5G gNB (e.g., base station) and next-generation communications, and/or beyond. In some embodiments, a base station (e.g., a gNB, a TRP) may include an antenna layout that includes multiple panel antennas. A user equipment (UE, sometimes referred to herein as a wireless communication device) may also include an antenna layout that includes multiple panel antennas (also referring to as "multiple panels"). The multiple panels on the UE are configured in order to cover a whole space for enhancing coverage. For example, a panel (sometimes referred to as a communications panel or a panel antenna) on either a TRP (e.g., a base station, a gNB) side or a UE side can have two transceiver units (TXRUs) that can be associated with cross polarization accordingly. Therefore, to achieve a high rank or multi-layer transmission, the TRP and UE may use different beams generated from different panels (which is also referred to as simultaneous transmission across multiple panels (STxMP)) in order to sufficiently utilize the capability of each panel, such as its associated TXRUs.

As noted above, analog beam-forming can be introduced into mobile communications for achieving the robustness of high frequency communications in 5G NR. For downlink (DL) transmissions, quasi-co location (QCL) state (e.g., transmission configuration indicator (TCI) state) has been introduced for supporting beam indication for DL control channel (e.g., physical downlink control channel (PDCCH)), DL data channel (e.g., physical downlink sharing channel (PDSCH)), and channel-state-information reference signalling (CSI-RS). Similarly, for uplink (UL) transmissions, spatial relation information (e.g., the corresponding higher layer parameter may be referred to as spatialRelationInfo) has been introduced for supporting beam indication for UL control channel (e.g., physical uplink control channel (PUCCH)), and sounding reference signal (SRS). Furthermore, the beam indication for UL data channel (e.g., physical uplink shared channel (PUSCH)) can be achieved through mapping between one or more SRS resources, which can be indicated by the gNB, and ports of the UL data channel. In other words, the beam configuration for UL data channel can be derived from the spatial relation information associated with the SRS resources or ports accordingly.

However, the conventional 5G NR solution is based on the scenario that there is only a single panel on the UE side, which means that only one DL transmission (TX) beam can be received, or only one UL TX beam can be transmitted at a given time instant. In order to improve the throughput and robustness, systems and methods of the present disclosure take into consideration of multi-beam operation based on multiple UE panels.

In some embodiments, systems and methods of the present disclosure handle the following issues herein below.

From the perspective of the base station (e.g., gNB) side, the definition or features with respect to the "UE panel" are disclosed herein, such as how to initialize one or more panel entities/units for DL and UL transmission, and whether or how the transmission capability or communication channel is determined according to the UE panel. For instance, the TX beams associated with the same UE panel may not be transmitted or received simultaneously, but the TX beams associated with different UE panels may be transmitted or received simultaneously, in some embodiments.

Furthermore, the scope and signaling of target resources or parameters to be associated with the UE panel(s) are described herein, which can enable a gNB to control UE panels. For example, the receiving procedure of DL signaling, the procedure of CSI reporting, and the transmission procedure of UL signaling under configurations of one or more given UE panels are discussed herein.

Moreover, taking into account the latency of activating or deactivating UE panel(s), the timeline of starting or stopping UL/DL transmissions associated with respective panels are disclosed. Additionally, one or more UE panels can be determined and ready for receiving or transmitting the subsequent signaling. In other words, panel determination rules for PDSCH, PUSCH and aperiodic CSI-RS to be dynamically scheduled are considered.

B. Multi-Panel User Equipment (MPUE) Scenarios

Figure 3:
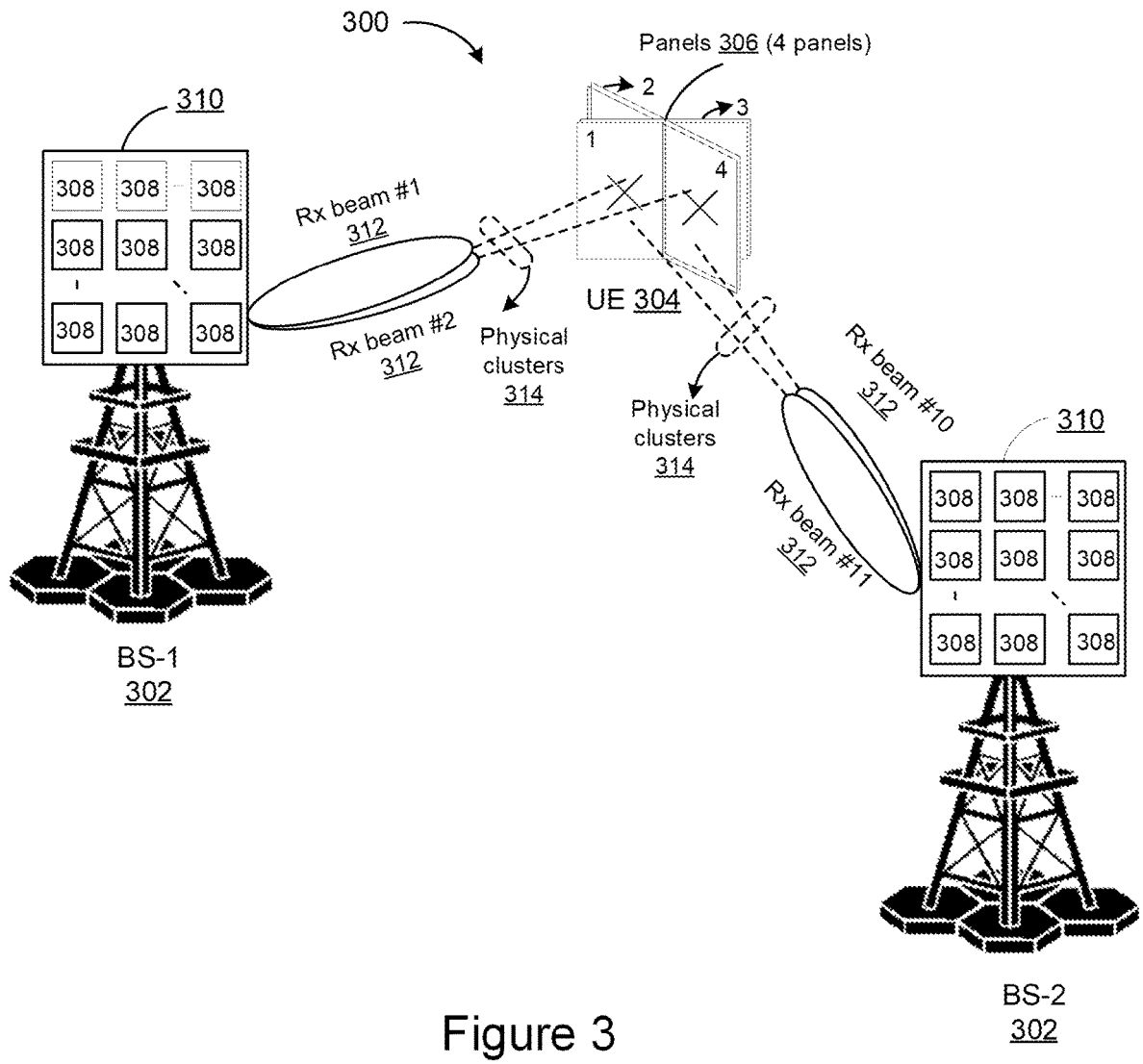
FIG. 3 illustrates a network diagram of communications between base station panel antennas and user equipment panel antennas, in accordance with some embodiments of the present disclosure.

FIG. 3 illustrates a network diagram 300 of communications between base station (BS) panel antennas 308 and user equipment (UE) panel antennas 306, in accordance with some embodiments of the present disclosure. FIG. 3 is shown to include two BSs 302 (e.g., wireless communication nodes 302, TRPs 302, gNBs 302) that can communicate with a UE 304 (e.g., wireless communication device 304). BSs 302 and UE 304 may be same or similar to BS 202 and UE 204 in FIG. 2, respectively. The BS-1 302 and BS-2 302 can each include or have one or more panel antennas 308. The BS panel antennas 308 may be part of a rectangular (or other shaped) panel array 310 that is part of each of the BSs 302. Accordingly, the panel array 310 may include a plurality of panel antennas 308. The UE 304 may include one or more panel antennas 306. In the example of FIG. 3, the UE 304 includes four panel antennas 306 (e.g., multiple panels 306, multiple UE panels 306). Although nine BS panel antennas 308 are illustrated for each panel array 310, BS panel arrays 310 may include any number of one or more BS panel antennas. Similarly, although four UE panel antennas are illustrated for UE 304, UE 304 may include any number of one or more UE panel antennas.

In some embodiments, the BS panel antennas 308 and the UE panel antennas 306 can produce transmitter (Tx) beams and receiver (Rx) beams, or alternatively transceiver beams. In the example of FIG. 3, receiver beams (e.g., Rx beams #1, #2, #10, #11) 312 (e.g., produced by UE panel antennas 306) are shown for illustrative purposes. In some embodiments, the Rx beams 312 may be used for beam measurement and/or reporting. The Rx beams 312 may pass a physical cluster 314 (e.g., a physical environment that the Rx beam 312 may pass through or bounce off of, such as buildings, objects, walls) before reaching a destination (e.g., BS 302).

Figure 4A:
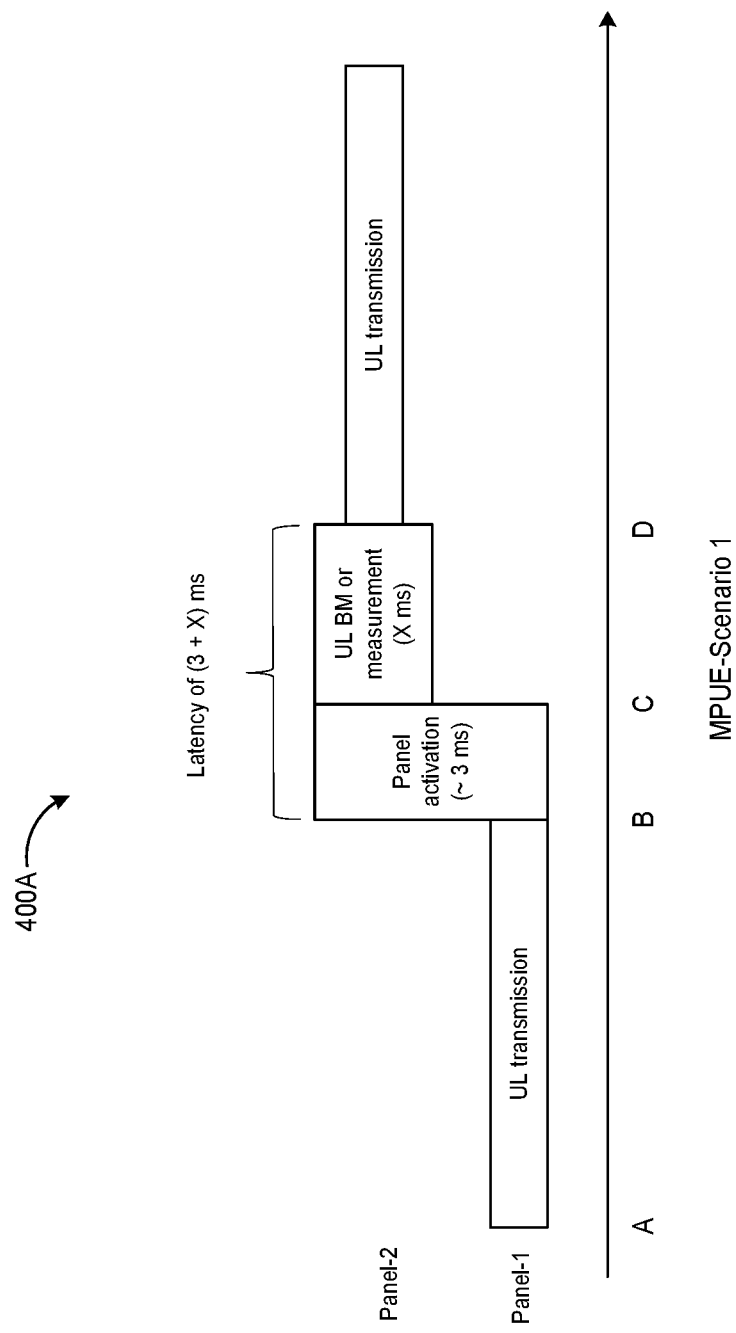
FIG. 4A is a block diagram illustrating an operating scenario for multi-panel user equipment (MPUE), in accordance with some embodiments of the present disclosure.
Figure 4B:
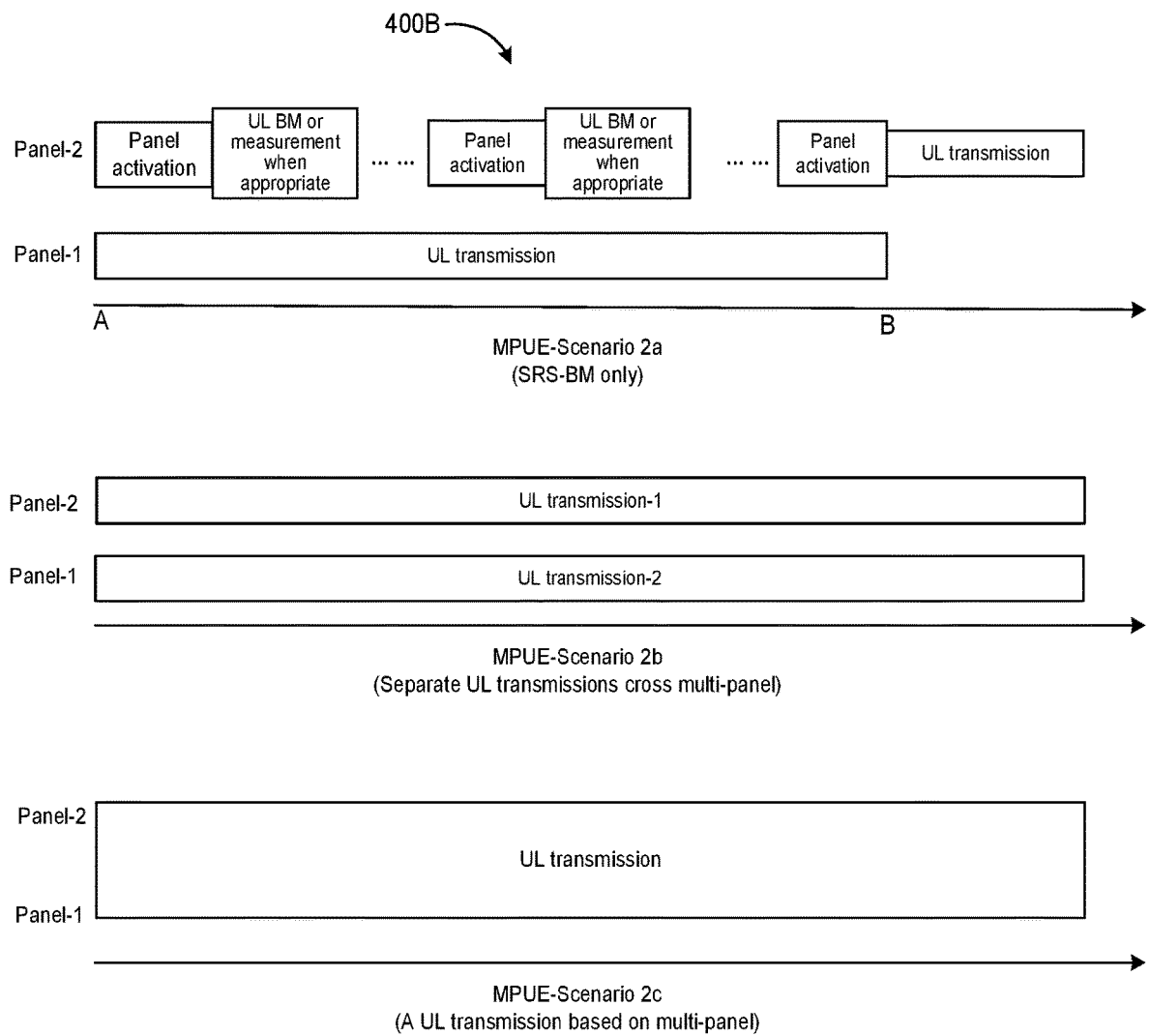
FIG. 4B is a block diagram illustrating another operating scenario for MPUE, in accordance with some embodiments of the present disclosure.
Figure 4C:
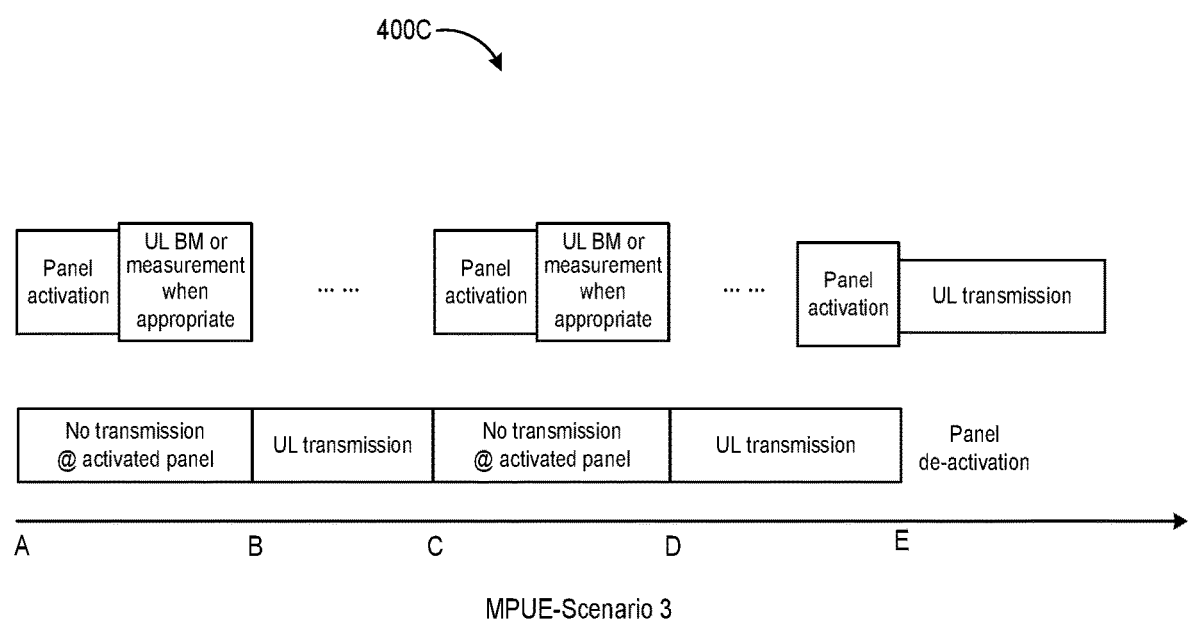
FIG. 4C is a block diagram illustrating yet another operating scenario for MPUE, in accordance with some embodiments of the present disclosure.

FIGS. 4A-4C are example block diagrams illustrating operating scenarios for multi-panel user equipment (MPUE), in accordance with some embodiments of the present disclosure. In some embodiments, taking into consideration of different capabilities of UEs, the UEs with multiple panels can be divided into multiple categories, as described herein below in relation to FIGS. 4A-4C.

Referring now to FIG. 4A, a block diagram of the first scenario 400A for MPUE is illustrated, in accordance with some embodiments of the present disclosure. In some embodiments, the first scenario (MPUE-scenario 1) depicts a scenario where multiple panels are implemented on a UE, and only one panel can be activated at a time, with a panel switching/activation delay of X milliseconds (ms). In some embodiments, the value of X ms can be 2 to 3 ms for instance, or within some other range(s). In other embodiments, the value of X ms can be any other values (e.g., 1 ms, 1.5 ms, 3.2 ms, 4 ms, 10 ms). As shown in FIG. 4A, a MPUE (e.g., UE 304 in FIG. 3) can have a panel-1 and a panel-2. From time A to time B, panel-1 can be activated and can perform uplink (UL) transmission (e.g., to a BS), while panel-2 is not activated for instance. At time B, panel-2 can start an activation process that can take approximately 3 ms in the example of FIG. 4A. As can be understood, in this example, the 3 ms is for illustrative purposes and should not be regarded as limiting. At time C, panel-2 may be activated while panel-1 may be deactivated. Panel-2 may perform UL beam (BM) measurement for X ms, where X can be any positive number. Accordingly, in this example, the latency between panel-1 UL transmission and panel-2 UL transmission can be (3+X) ms, in some embodiments. At time D, panel-2 can start to perform UL transmission. In some embodiments, at time D, the MPUE may alternatively switch back to panel-1 for UL transmission (not illustrated in FIG. 4A).

Referring now to FIG. 4B, a block diagram of the second scenario 400B for a MPUE is illustrated, in accordance with some embodiments of the present disclosure. In some embodiments, the second scenario (MPUE-Scenario 2) depicts a scenario where multiple panels are implemented on a UE, multiple panels can be activated at a time, and one or more panels can be used for transmission. In some embodiments, the second scenario can include three sub-scenarios, MPUE-Scenario 2a, MPUE-Scenario 2b, and MPUE-Scenario 2c. Referring to FIG. 4B, in some embodiments, MPUE-Scenario 2a depicts a scenario where, at a given time instant, one or more panels can be used for UL reference signal (RS) (e.g., sounding reference signal (SRS) for beam management) transmission, but only one panel can be used for UL data and control channel transmission. For example, as shown in MPUE-Scenario 2a in FIG. 4B, at any given time instant between time A and time B, panel-2 of the MPUE (e.g., UE 304) can go through multiple panel activations and UL BM and/or measurements when appropriate, but only panel-1 of the MPUE may be used for UL data and control channel transmission. Continuing with this example, at time B, panel-2 can be switched on or activated for UL data and/or control channel transmission when panel-1 stops its UL data and/or control channel transmission.

In some embodiments, MPUE-Scenario 2b depicts a scenario where, at a given time instant, different panels can be used for transmission of respective UL signals, but only one panel can be used for one UL signal transmission. For example, as shown in MPUE-Scenario 2b in FIG. 4B, at a given time instant, panel-1 and panel-2 can be used for transmission of respective UL signals (e.g., panel-1 performs UL transmission-1 and panel-2 performs UL transmission-2), but only one panel can be used for one UL signal transmission (e.g., panel-1 and panel-2 cannot both perform UL transmission-1 (or UL transmission-2) concurrently or simultaneously.)

In some embodiments, MPUE-Scenario 2c depicts the scenario where, at a given time instant, one or more panels can be used for one UL transmission. For example, as shown in MPUE-Scenario 2c in FIG. 4B, at a given time instant, both panel-1 and panel-2 can be used for performing one UL transmission (e.g., same UL transmission).

Referring now to FIG. 4C, a block diagram of the third scenario 400C for MPUE is illustrated, in accordance with some embodiments of the present disclosure. In some embodiments, the third scenario (MPUE-scenario 3) depicts a scenario where multiple panels can be implemented on a UE and multiple panels can be activated at a time, but only one panel can be used for transmission for instance. For example, as shown in FIG. 4C, both panel-1 and panel-2 of the MPUE (e.g., UE 304) can be active, but only one panel can be used for transmission at a time. For instance, between time A and time B, panel-2 may perform panel activation and UL BM and/or measurement when appropriate while there is no transmission at panel-1. Between time B and time C, panel-1 can perform UL transmission. Between time C and time D, panel-2 may perform panel activation and UL BM and/or measurement when appropriate while there is no transmission at panel-1. Between time D and time E, panel-1 performs UL transmission. At time E, panel-2 starts to perform UL transmission while panel-1 is de-activated.

In some embodiments, systems and methods of the present disclosure can manage multiple UE panels on a UE, for example, using one or more group identifiers (group IDs). For example, each of the panels 306 of the UE 304 in FIG. 3 can be represented or identified by a respective or corresponding (e.g., different, unique) group identifier. Similarly, for example, each of panel-1 and panel-2 of the MPUE in FIGS. 4A-4C can be represented or identified by a respective or corresponding (e.g., different, unique) group identifier. In some embodiments, a group identifier can be represented by a number (e.g., group identifier 1=1, group identifier 2=2), a letter (e.g., group identifier 1=a, group identifier 2=b), a symbol (e.g., group identifier 1=#, group identifier 2=*), a term, a random number, and/or in any other format where each group identifier associated with a UE can be uniquely identified among the group identifiers associated with the UE. The definition of the Group ID is described herein below in more detail. It should be understood that the examples of group identifiers discussed in this disclosure are for illustrative purposes only and should not be regarded as limiting.

As an example in relation to FIG. 4A, in some embodiments, a wireless communication device (e.g., a UE) can include multiple communications panels (e.g., panel-1, panel-2) each associated with a respective group identifier, and only one of the communications panels is configured to be activated at a time. As an example in relation to FIG. 4B, in some embodiments, a wireless communication device (e.g., a UE) can include multiple communications panels (e.g., panel-1, panel-2) each associated with a respective group identifier, and one or more of the communications panels are configured to be activated at a time. As an example in relation to FIG. 4C, in some embodiments, a wireless communication device (e.g., a UE) can include multiple communications panels (e.g., panel-1, panel-2) each associated with a respective group identifier, and only one of the communications panels is configured for communication between the wireless communication device (e.g., a UE) and the wireless communication node (e.g., a BS, a TRP, a gNB) at a time.

In some embodiments, the definition of "beam" can be equivalent to, defined as, and/or alternatively referred to as quasi-co-location (QCL) state, transmission configuration indicator (TCI) state, spatial relation state (also referred to as spatial relation information state), reference signal (RS), spatial filter and/or pre-coding.

In some embodiments, the definition of "Tx beam" can be equivalent to, defined as, and/or alternatively referred to as QCL state, TCI state, spatial relation state, DL/UL reference signal (e.g., channel state information reference signal (CSI-RS), synchronization signal block (SSB) which is also referred to as synchronization signal/physical broadcast channel (SS/PBCH), demodulation reference signal (DMRS), sounding reference signal (SRS)), Tx spatial filter and/or Tx precoding. In some embodiments, the definition of "Rx beam" can be equivalent to, defined as, and/or alternatively referred to as QCL state, TCI state, spatial relation state, spatial filter, Rx spatial filter and/or Rx precoding.

In some embodiments, the definition of "beam ID" can be equivalent to, defined as, and/or alternatively referred to as QCL state index, TCI state index, spatial relation state index, reference signal index, spatial filter index and/or precoding index. In some embodiments, the spatial filter can be either a UE-side spatial filter or a gNB-side spatial filter. In some embodiments, the spatial filter can also be referred to as a spatial-domain filter.

In some embodiments, "spatial relation information" can be comprised of (or can comprise) one or more reference RSs, which can be used to represent the "spatial relation" between a targeted "RS or channel" and the one or more reference RSs, where "spatial relation" may mean (or indicate) the same beam(s), quasi-co beam(s), same spatial parameter(s), or quasi-co spatial parameter(s), same spatial domain filter(s), and/or quasi-co spatial domain filter(s).

In some embodiments, "QCL state" can be comprised of (or can comprise) one or more reference RSs and their corresponding QCL type parameters, where QCL type parameters may include at least one of the following aspects or a combination of one or more of the following aspects: [1] Doppler spread, [2] Doppler shift, [3] delay spread, [4] average delay, [5] average gain, and [6] Spatial parameter. In some embodiments, "QCL state" can be equivalent to equivalent to, defined as, and/or alternatively referred to as "TCI state".

C. Definition of Group ID for Panel-Specific Management

In some embodiments, a group ID can be equivalent to, defined as, and/or alternatively referred to as a "resource set ID", "panel ID", "sub-array ID", "antenna group ID", "antenna port group ID", "ID for group of antenna port", "beam group ID", "transmission entity/unit", and/or "reception entity/unit". In some embodiments, a "group ID" can represent a UE panel and/or some features related to the UE panel. In some embodiments, the "group ID" can also be equivalent, defined as, and/or alternatively referred to as to "group state". For example, a group ID can be or include at least one of a panel identifier, a resource set identifier, a sub-array identifier, an antenna group identifier, an antenna port group identifier, an identifier for a group of antenna port, a beam group identifier, a transmission entity, a transmission unit, a reception entity, a reception unit, and/or a group state. In some embodiments, the group ID can describe one or a combination of the features described below.

Simultaneous Transmission or Reception

In some embodiments, multiple options can be provided for simultaneous transmission or reception with respect to a MPUE.

Under option 1, signals (e.g., RS(s), channel(s)) associated with the same group ID may not be simultaneously communicated (e.g., received or transmitted). In some embodiments, the signals can include reference signals (RSs) and/or channels. A RS can be a downlink RS or an uplink RS. For example, the downlink RS can include a CSI-RS, physical broadcast channel/synchronization signal (PBCH/SS), and/or DL DMRS, and an uplink RS can include a physical Random-Access Channel (PRACH), SRS, and/or UL DMRS. A channel can include a DL channel and/or a UL channel. For example, a DL channel can include a PDSCH, a PDCCH, and/or a control resource set (CORESET), and a UL channel can include a PUSCH and/or a PUCCH. In some embodiments, the condition of the signals (e.g., RS(s), channel(s)) not being simultaneous communicated (e.g., received or transmitted), can include or correspond to the RS(s)/channel(s) being configured within a RS/channel set.

In some embodiments, a wireless communication node (e.g., a BS, a TRP, a gNB) and/or a wireless communication device (e.g., a UE) can determine, identify, or detect that signals (e.g., RS(s) and/or channel(s)) to be communicated between the wireless communication device and the wireless communication node, are associated with a group identifier. In these embodiments, the wireless communication node and/or the wireless communication device, responsive to determining that the signals are associated with the group identifier, can configure (e.g., arrange for, coordinate, setup, control, manage and/or enable) communication of the signals between the wireless communication device and the wireless communication node, without simultaneous communication of the signals (e.g., simultaneous communication of the signals is disallowed or not allowed, no simultaneous Tx/Rx of the signals, no overlap in time for Tx/Rx of the signals). In some embodiments, the group identifier can be associated with (e.g., assigned, linked and/or mapped to) a panel among multiple panels of the wireless communication device (e.g., a MPUE). In some embodiments, the panel can be configured to communicate (e.g., transmit, receive) the signals.

In some embodiments, signals (e.g., RS(s), channel(s)) associated with different group IDs can be simultaneously received and/or transmitted. Furthermore, the condition of being simultaneous received or transmitted for the signals (e.g., RS(s), channel(s)) can also include that the RS(s)/channel(s) are configured in different RS/channel sets. Moreover, RS(s)/channel(s) for UL, RS(s)/channels associated with different set of group ID(s) can be simultaneously transmitted, configured such that, at a given time instant, only one group from the set of group ID(s) can be activated for UL transmission for example.

In some embodiments, a wireless communication node (e.g., a BS, a TRP, a gNB) and/or a wireless communication device (e.g., a UE) can determine, identify, or detect that signals (e.g., RS(s) and/or channel(s)) to be communicated between the wireless communication device and the wireless communication node, are each associated with a different group identifier. In these embodiments, the wireless communication node and/or the wireless communication device, responsive to determining that the signals are each associated with a different group identifier, can configure (e.g., arrange for, coordinate, setup, control, manage and/or enable) communication of the signals between the wireless communication device and the wireless communication node, to permit simultaneous communication of the signals.

In some embodiments, a wireless communication node (e.g., a BS, a TRP, a gNB) and/or a wireless communication device (e.g., a UE) can determine, identify, or detect that signals (e.g., RS(s) and/or channel(s)) to be communicated between the wireless communication device and the wireless communication node, are associated with a set of one or more group identifiers. In these embodiments, the wireless communication node and/or the wireless communication device, responsive to determining that the signals are associated with the set of the one or more group identifiers, can configure (e.g., arrange for, coordinate, setup, control, manage and/or enable) communication of the signals between the wireless communication device and the wireless communication node, without simultaneous communication of the second signals (e.g., simultaneous communication of the signals is disallowed or not allowed, no simultaneous Tx/Rx of the signals, no overlap in time for Tx/Rx of the signals).

Under option 2, in some embodiments, up to N different signals (e.g., RS(s)/channel(s)) associated with the same group ID can be simultaneously received or transmitted, where N is positive integer. For example, a total of X different signals are associated with the same group ID, but only up to N (<=X) different signals can be transmitted simultaneously, where N is a positive integer, X is a positive integer, and N<=X. In some embodiments, signals (e.g., RS(s)/channel(s)) associated with different group IDs can be simultaneously received or transmitted. Furthermore, in some embodiments, for signals (e.g., RS(s)/channel(s)) for UL, signals (e.g., RS(s)/channel(s)) associated with different sets of group ID(s) can be simultaneously transmitted.

In some embodiments, a wireless communication node (e.g., a BS, a TRP, a gNB) or a wireless communication device (e.g., a UE) can determine, identify, or detect that signals (e.g., RS(s), channel(s)) to be communicated between the wireless communication device and the wireless communication node, are associated with a group identifier. In these embodiments, the wireless communication node or the wireless communication device, responsive to determining that the signals are associated with the group identifier, can configure (e.g., arrange for, coordinate, setup, control, manage and/or enable) communication of the signals between the wireless communication device and the wireless communication node, to permit (e.g., allow, enable, and/or be configured for) simultaneous communication of up to N of the first signals. In some embodiments, N is a positive integer. In some embodiments, the group identifier can be associated with (e.g., assigned, linked and/or mapped to) a panel among multiple panels of the wireless communication device (e.g., a MPUE). In some embodiments, the panel can be configured to communicate (e.g., transmit, receive) the signals (e.g., first signals).

In some embodiments, the association between the group ID and the signals (e.g., RS(s)/channel(s)) can be determined according to an association between a set that the signals (e.g., RS(s)/channel(s)) belong to, and the group ID. For example, if there is a RS-1 (e.g., signal 1) from set-A and a RS-2 (e.g., signal 2) from set-B on a UE side, and if set-A and set-B are associated with the same group ID (or panel ID), RS-1 and RS-2 cannot be transmitted simultaneously. On the other hand, if set-A and set-B are associated with different group IDs (or panel IDs), RS-1 and RS-2 can be transmitted simultaneously. Furthermore, in some embodiments, RS-1 and RS-2 can each be from a different component carrier (CC), different bandwidth part (BWP), and/or have a different time-domain behavior.

In some embodiments, a wireless communication node (e.g., a BS, a TRP, a gNB) or a wireless communication device (e.g., a UE) can determine, identify, or detect that first signals (e.g., RS(s), channel(s)) are associated with a first group identifier, according to an association between the first group identifier and a first set to which the first signals belong. In some embodiments, the wireless communication node and/or the wireless communication device can determine, identify, or detect that second signals (e.g., RS(s) and/or channel(s)) are associated with a second group identifier, according to an association between the second group identifier and a second set to which the second signals belong. In these embodiments, the wireless communication node and/or the wireless communication device can configure communication of a first signal from the first signals and a second signal from the second signals, between the wireless communication device and the wireless communication node, to permit simultaneous communication of the first signal and the second signal.

Scheduling or Activation Offset

In some embodiments, when the DL signals (e.g., DL RS(s)/channel(s)) that are to be scheduled dynamically (e.g., including aperiodic (AP) CSI-RS or PDSCH), are associated with different group ID(s) from the group ID(s) to be used for the specific DL transmission, the scheduling offset of the signals (e.g., RS(s)/channel(s)) may be larger than or equal to X1, where X1 is a positive number. In some embodiments, the value of X1 is up to UE capability. Furthermore, in some embodiments, the specific DL transmission can be the transmission for data/control channel(s) and/or RS(s), where the data/control channel(s) and/or RS(s) can include at least one of: a CORESET with the lowest ID, a CORESET group, a PDSCH, and/or RSs. In some embodiments, the DL transmission can be the latest DL transmission. Furthermore, in some embodiments, the group ID(s) to be used for the specific DL transmission can be determined according to at least one of the following: current group ID(s) activated by media access control-control element (MAC-CE)/DCI, group ID(s) associated with one of the CORESETs, group ID(s) determined by active TCI states for PDSCH, and/or group ID(s) for CSI-RS (e.g., CSI-RS for tracking, or periodic or semi-persistent CSI-RS).

In some embodiments, when the UL signals (e.g., UL RS(s)/channel(s)) that are to be scheduled dynamically (e.g., including AP-SRS, PUSCH (i.e., grant-based PUSCH) or PUCCH) are associated with different group ID(s) from the group ID(s) to be used for the specific UL transmission, the time domain offset (or scheduling offset) of the signals (e.g., RS(s)/channel(s)) may be larger than or equal to X2, where X2 is a positive number. In some embodiments, the value of X2 is up to (or can be determined according to) UE capability. Furthermore, in some embodiments, the specific UL transmission can be the transmission for data/control channel(s) and/or RS(s), where the data/control channel(s) and/or RS(s) can include at least one of: a PUCCH resource with a lowest ID, a PUCCH resource group, and/or RSs. In some embodiments, the UL transmission can be the latest DL transmission. Furthermore, in some embodiments, the group ID(s) to be used for the specific UL transmission can be determined according to at least one of the following: a current active group ID by MAC-CE/DCI, a group ID associated with one of PUCCH, and/or a SRS associated with PUSCH transmission, e.g., a periodic or semi-persistent SRS.

In some embodiments, the scheduling offset can refer to the time-domain offset between the control signaling (e.g., DCI) and the signals (e.g., RS(s)/channel(s)) that is scheduled, triggered or in response to the control signaling. Furthermore, in some embodiments, the time point of control signaling for counting and/or determining scheduling offset is determined according to the last time unit, e.g., symbol, of the control signaling. Furthermore, in some embodiments, the time point of the signals (e.g., RS(s)/channel(s)) for counting and/or determining scheduling offset is determined according to the first time unit, e.g., symbol, of the the signals (e.g., RS(s)/channel(s)).

In some embodiments, a wireless communication node (e.g., a BS, a TRP, a gNB) and/or a wireless communication device (e.g., a UE) can determine, identify, or detect that signals (e.g., RS(s) and/or channel(s)) to be communicated between the wireless communication device and the wireless communication node, are associated with a different group identifier. In these embodiments, the wireless communication node and/or the wireless communication device, responsive to determining that the signals are each associated with a different group identifier, can configure (e.g., arrange for, coordinate, setup, control, manage and/or enable) an offset between transmissions of the signals to be larger than or equal to a defined value. In some embodiments, the different group identifiers of the signals can include a first group identifier.

In some embodiments, a wireless communication node (e.g., a BS, a TRP, a gNB) and/or a wireless communication device (e.g., a UE) can determine, identify, or detect that a signal (e.g., a RS and/or a channel) to be communicated between the wireless communication device and the wireless communication node, is associated with a different group identifier from a default group identifier. In these embodiments, the wireless communication node and/or the wireless communication device, responsive to determining that the signal is associated with a different group identifier from a default group identifier, can configure (e.g., arrange for, coordinate, setup, control, manage and/or enable) a scheduling offset between control signaling and the signal that is responsive to the control signaling, to be larger than or equal to a defined value. In some embodiments, the default group identifier can comprise a first group identifier.

In some embodiments, the default group identifier can be determined according to a group identifier activated by a media access control-control element (MAC-CE) or downlink control information (DCI), a group identifier associated with a control resource set (CORESET), a group identifier determined by an active transmission configuration indicator (TCI) state for a shared channel (e.g., PDSCH), a group identifier for a channel state information reference signal (CSI-RS), a group identifier associated with a control channel (e.g., PUCCH), and/or a group identifier for a sounding reference signal (SRS).

Large-Scale Parameters

In some embodiments, a large scale parameter can include at least one of a path loss, a coupling loss, a timing advance (TA), a Doppler shift, a Doppler spread, an average delay, a delay spread, a minimum peak effective isotropic radiated power (EIRP), or a spherical coverage.

In some embodiments, the signals (e.g., RS(s)/channel(s)) associated with the same group ID can have the same or similar large scale parameter. Furthermore, in some embodiments, the condition of having the same large scale parameter for the signals (e.g., RS(s)/channel(s)) can also include: the signals (e.g., RS(s)/channel(s)) are configured within a set of signals (e.g., RS/channel set), or within the same bandwidth part (BWP) or cell.

In some embodiments, the signals (e.g., RS(s)/channel(s)) associated with different group IDs may have different large scale parameters. Furthermore, in some embodiments, the condition of having different large scale parameters for the signals (e.g., RS(s)/channel(s)) can include: the signals (e.g., RS(s)/channel(s)) are configured in different sets of signals (e.g., different RS/channel sets), or in different BWP or cells.

In some embodiments, a wireless communication node (e.g., a BS, a TRP, a gNB) and/or a wireless communication device (e.g., a UE) can determine, identify, or detect that signals (e.g., RS(s) and/or channel(s)) to be communicated between the wireless communication device and the wireless communication node, are associated with a group identifier. In these embodiments, the wireless communication node and/or the wireless communication device, responsive to determining that the signals are associated with the group identifier, can apply at least one large scale parameter associated with the group identifier to the signals.

In some embodiments, a wireless communication node (e.g., a BS, a TRP, a gNB) and/or a wireless communication device (e.g., a UE) can determine, identify, or detect that signals (e.g., RS(s) and/or channel(s)) to be communicated between the wireless communication device and the wireless communication node, are each associated with a different group identifier. In these embodiments, the wireless communication node and/or the wireless communication device, responsive to determining that the second signals are each associated with a different group identifier, can apply a different large scale parameter to each of the signals.

D. Initializing the Group ID for DL and UL Transmission, Considering the Imbalance of DL and UL Panels In some embodiments, the group ID can be used, shared, provided and/or communicated to coordinate multi-panel based UL and DL transmissions for both the gNB side and the UE side. Therefore, the UE panel with respect to the subsequent transmission between the gNB and the UE should be understood. In some embodiments, in general, the numbers of DL or UL panels (also referred to as Rx or Tx panels) on a UE are up to (or based on, depend on) the UE capability, and the subsequent transmission scheduled by the gNB should meet them as upper bounds. However, as a starting point of the panel-specific management, the numbering of the group ID (e.g., panel ID) for the group-ID indication of the target RS(s)/channel(s) may be determined by the gNB or the UE, as described below.

In some embodiments, the numbering of the group ID can be determined by the gNB according to the UE capability. In some embodiments, the "group ID(s)" can be initialized by configuring them with the reference DL or UL RSs by the gNB (e.g., set ID for SRS resources for beam management). In some embodiments, when receiving the configuration or activation signaling with the group ID(s) to be initialized, the UE can enable the mapping between the group ID(s) and the actual UE panel(s), irrespective of panel virtualization, where the actual mapping can be transparent to the gNB. Meanwhile, the mapping can be kept unchanged, in order to ensure the same understanding for the subsequent transmission between the gNB and the UE.

In some embodiments, the initialization of the group ID(s) is applied only when the specific DL or UL RS (also referred to as reference DL or UL RS) is configured or activated with group ID(s). Furthermore, in some embodiments, the specific UL RS can be or include at least one of the following: a PRACH (e.g., a PDCCH ordered PRACH), a SRS resource set and/or a SRS resource. In some embodiments, the specific UL RS can refer to the SRS resource set for beam management. In some embodiments, the specific UL RS can refer to the SRS resource or the SRS resource set for antenna switching. Furthermore, in some embodiments, the specific DL RS can be or include at least one of the following: a CSI-RS resource set and/or a CSI-RS resource. Furthermore, in some embodiments, the CSI-RS is configured with high layer parameter repetition (e.g., used for beam management). Furthermore, in some embodiments, the mapping between the group ID and the actual UE panel can be kept unchanged within a window of time or until the reconfiguration/activation for the DL or UL RSs.

In some embodiments, the numbering of the group ID can be determined or reported by the UE. In some embodiments, the group ID is initialized according to the group-based or panel-specific beam reporting. In the beam reporting, the index of the DL RS(s) and corresponding group ID (e.g., panel ID) used for receiving the DL RS(s), is carried, in some embodiments. Consequently, when the DL RS(s) is used as reference RS as TCI state or spatial relation for DL or UL beam indication, respectively, the UE can derive the corresponding group ID or information of which UE panel should be used for the transmission. In some embodiments, the size (e.g., the number of bits to be used) of the field of group ID in a reporting instant should be determined by the UE capability. For example, if up to 4 panels are reported in the UE capability signaling, the size of the group ID field in one reporting instance should be 2 bit, irrespective of the number of group IDs to be reported in this case. This is due to the fact that the consistency of mapping between the group ID and actual UE panel should be guaranteed or ensured.

In some embodiments, the group ID(s) for DL and the group ID(s) for UL can be associated. Furthermore, in some embodiments, the group ID(s) can be grouped into one or more sets, where a set of the group ID(s) for DL can be associated with a group ID for UL or a set of group ID(s) for UL.

In some embodiments, in order to reduce the implementation complexity, from the UE's perspective, the number of DL Rx panels and the number of UL Tx panels may not be the same. In some embodiments, in general, the UL Tx panels (or activated UL Tx panels for transmission) may be less than the DL Rx panels (or activated DL Rx panels for reception). In other words, there may be fewer UL Tx panels (or activated UL Tx panels for transmission) than DL Rx panels (or activated DL Rx panels for reception) on a MPUE.

Figure 5:
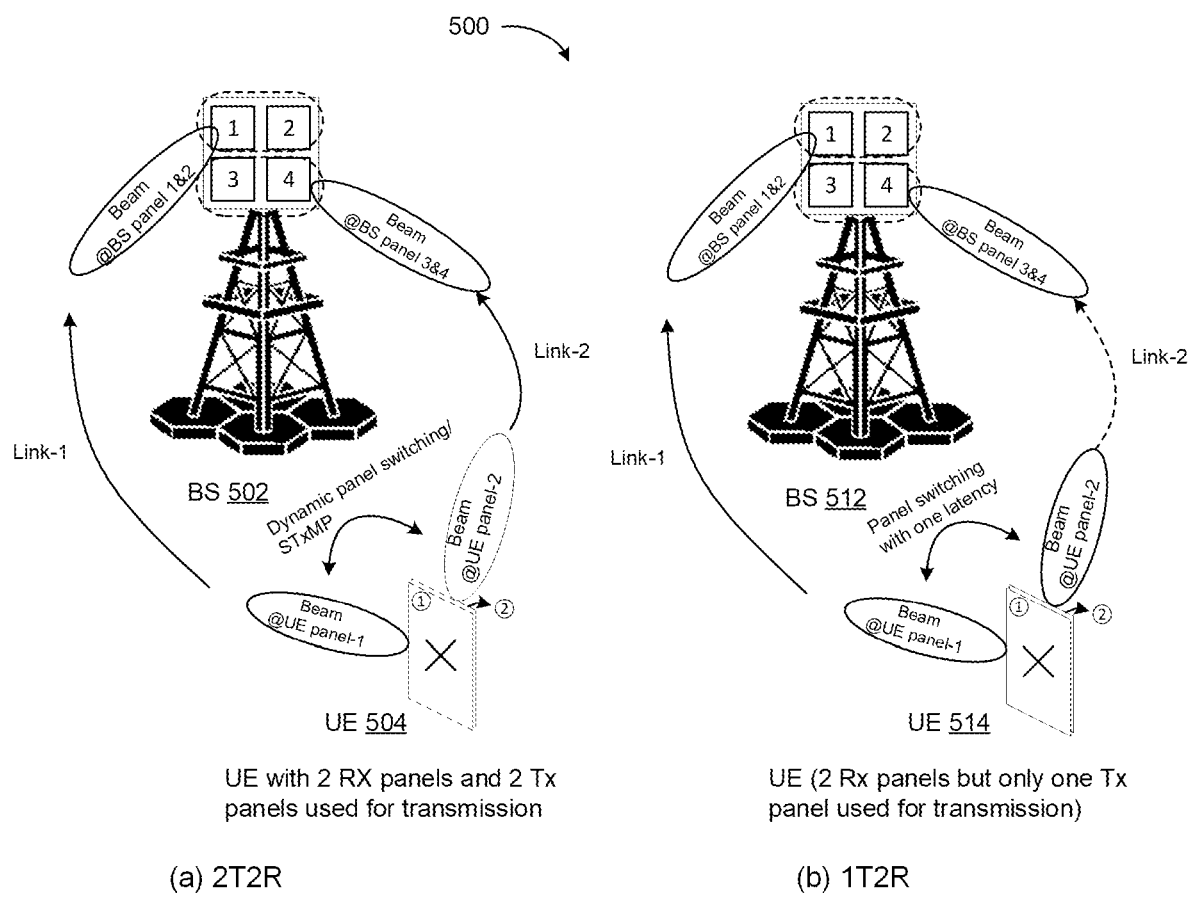
FIG. 5 illustrates a network diagram for panel-specific management with an imbalance between DL and UL panels, in accordance with some embodiments of the present disclosure.

FIG. 5 illustrates a network diagram 500 for panel-specific management with an imbalance between DL and UL panels, in accordance with some embodiments of the present disclosure. FIG. 5 illustrates two scenarios (a) 2T2R and (b) 1T2R, where in each scenario, a UE 504, 514 and a BS (e.g., TRP, gNB) 502, 512 can transmit/receive beams between respective panels of the UE and the BS. As shown in FIG. 5, in scenario (a) 2T2R, the UE 504 includes two Rx panels and two Tx panels for communicating with the BS 502. In scenario (b) 1T2R, the UE 514 includes two Rx panels, but only one Tx panels for communicating with the BS 512. In some embodiments, the UEs (e.g., UE 504) can perform dynamic panel switching/STxMP. In some embodiments, the UEs (e.g., UE 514) can perform panel switching where latency can occur, or to avoid signal blockage.

In some embodiments, from the UE's perspective, the (set of) Tx group IDs and the (set of) Rx group IDs can be associated/paired. In some embodiments, a Tx group ID with an index of TxID can be associated with a Rx group ID with index of RxID, if TxID=RxID mod E, where E is a positive integer (e.g., E=1, 2, 3 . . . ). In some embodiments, a new association function between DL group and UL group can be configured through a new signaling by the gNB, where (i) there are separate IDs for DL and UL panels, and (ii) an UL ID is configured to be associated/paired with a DL group ID in the new signaling.

In some embodiments, a wireless communication node (e.g., a BS, a TRP, a gNB) can determine (or identify, detect) one or more group identifiers according to a capability of the wireless communication device.

In some embodiments, a wireless communication device (e.g., a UE) can determine (or identify, detect) one or more group identifiers in channel state information (CSI) reporting. In some embodiments, a wireless communication device (e.g., a UE) can determine (or identify, detect) a bit size of a field of the group identifiers in the CSI reporting according to a capability of the wireless communication device.

In some embodiments, a wireless communication node (e.g., a BS, a TRP, a gNB) and/or a wireless communication device (e.g., a UE) can associate at least one group identifier of a plurality of group identifiers for downlink communication, with at least one group identifier for uplink communication.

In some embodiments, the group identifiers can be grouped into one or more sets including a first set for downlink communication, and a first set can be associated with a group identifier for uplink communications or a set of group identifiers for uplink communications.

E. Description of Target Resources or Parameters to be Associated with the Group ID In some embodiments, in order to assist the transmission of signals (e.g., RS(s), channel(s)) in the given UE panel(s), the group ID can be associated with target resources or parameters. In some embodiments, the target RS(s)/channel (s) can include at least one of the following:
  (a) UL RS, which can include: (i) PRACH (e.g., PDCCH order), and/or (ii) SRS resource set, SRS resource, SRS resource port group, and/or SRS resource port, which are used for at least one of the following usages: codebook transmission; non-codebook transmission; beam management; antenna switching; and/or positioning.
  (b) DL RS, which can include CSI-RS resource set, CSI-RS resource, CSI-RS resource port group, and/or CSI-RS resource port, where the CSI-RS can have the at least one of the following configurations: (i) CSI-RS with repetition=on or off, and/or (ii) CSI-RS for CSI. Furthermore, in some embodiments, the CSI-RS for CSI is used to obtain the panel-specific CSI reporting, including CSI-RS resource indicator (CRI), precoding matrix indicator (PMI), channel quality indicator (CQI), rank indicator (RI), and/or layer indicator (LI). Furthermore, CSI-RS for tracking can be included.
  (c) PUCCH resource and/or PUCCH resource group.
  (d) PDCCH, which can include control resource set (CORESET), CORESET group, search space set, and/or group of search space set.
  (e) PDSCH, which can include PDSCH DMRS port group, and/or high layer parameter PDSCH-Config ID.
  (f) PUSCH, which can include PUSCH DMRS port group, and/or higher layer parameter PUSCH-Config ID.
  (g) Bandwidth part (BWP). In some embodiments, there can be N active BWPs for different group IDs, respectively, where N is a positive integer.

In some embodiments, the configuration parameters can be grouped or determined according to its associated UE panels, due to the fact that, for the perspective of baseband of receivers, the physical channels are determined according to the boresight of UE panels. In some embodiments, the group ID can be associated with at least one of the following configuration parameters:
  (a) UL power control parameters, which can include (i) path-loss (PL) or DL RS(s) for PL; closed loop (CL) index; target power P0/path-loss factor alpha; scaling factor; (ii) $P_{MAX}$, MPR/A-MPR, or Maximum Permissible Exposure (MPE); and/or (iii) power headroom (PHR).
  (b) Timing advance (TA) parameter.
  (c) TCI/spatial relation. In some embodiments, TCI or spatial relation may be one container of group ID, or TCI or spatial relation are joint coded with panel-ID. For example, the group ID in Table 1 (e.g., "group-ID", "Group-StateId") may be added into high layer parameter TCI as follows in ASN.1. In some embodiments, once the TCI-state is configured or indicated for one DL transmission (e.g., the scheduled PDSCH), the UE can derive the corresponding UE panel(s) to be used according to the group ID contained in the TCI-state accordingly.

TABLE 1

| (High layer parameter TCI state carrying the group ID) | |
| --- | --- |
| TCI-State ::= | SEQUENCE { |
| tci-StateId | TCI-StateId, |
| group-ID | Group-StateId, |
| qcl-Type1 | QCL-Info, |
| qcl-Type2 | QCL-Info |
| } | |

(d) CSI reporting, including CSI reporting configuration and/or triggering state of CSI reporting. Furthermore, the CSI reporting associated with the group ID can obtain at least one of the following: (i) Panel-specific CSI reporting that at least comprises CSI-RS resource indicator (CRI), precoding matrix indicator (PMI), channel quality indicator (CQI), rank indicator (RI) or layer indicator (LI), and/or (ii) Panel-specific beam reporting that at least comprises CRI, synchronization signal or physical broadcast channel (SS/PBCH) indicator, reference signal received power (RSRP), or signal-to-interference-plus-noise ratio (SINR).
  (e) Triggering state for DL or UL RS (e.g., ap-CSI-RS or ap-SRS).
  (f) Slot format indicator (SFI), where (i) U (group), D (group) or F (group) can be associated with a group ID (e.g., panel ID (s)), where "D", "U" and "F" denotes downlink, uplink, and flexible, respectively, and/or (ii) Slot format (group) candidate can be associated with a group ID (e.g., panel ID (s)).
  (g) Time domain window. In some embodiments, taking into account the latency for panel switching and only one activated panel for transmission in MPUE-scenarios 1 and 3, the time domain window can be used for probing or measuring the channel quality under a candidate panel (e.g., a non-transmission panel). In some embodiments, the recommended window is applied across all intra-band component carrier (CC) with the scheduling restriction (e.g., PUSCH/PUCCH cannot be transmitted within the window). In some embodiments, the recommended window is only applicable when the given slot is U (uplink) or Flexible-formats. In other words, the UE can ignore the window when the given slot is D (downlink). In some embodiments, the window can be triggered, activated or configured by DCI, MAC-CE or RRC, respectively.

In some embodiments, a wireless communication node (e.g., a BS, a TRP, a gNB) and/or a wireless communication device (e.g., a UE) can associate a group identifier with at least one target resource of a physical random access channel (PRACH), a sounding reference signal (SRS), a channel state information reference signal (CSI-RS), a physical uplink control channel (PUCCH), a physical uplink shared channel (PUSCH), a physical downlink control channel (PDCCH), or a bandwidth part (BWP).

In some embodiments, the PRACH can be ordered or triggered by the PDCCH or initialized by beam recovery. In some embodiments, the SRS can include at least one of a SRS resource set, a SRS resource, a SRS resource port group or a SRS resource port. In some embodiments, the CSI-RS can include at least one of a CSI-RS resource set, a CSI-RS resource, a CSI-RS resource port group, or a CSI-RS resource port. In some embodiments, the PUCCH can include at least one of a PUCCH resource or a PUCCH resource group. In some embodiments, the PUSCH can include at least one of a PUSCH DMRS port group, or configuration parameters for the PUSCH. In some embodiments, the PDCCH can include at least one of a control resource set (CORESET), a CORESET group, a search space set, or a group of search space sets. In some embodiments, the PDSCH can include at least of a PDSCH DMRS port group, or configuration parameters for the PDSCH.

In some embodiments, a wireless communication node (e.g., a BS, a TRP, a gNB) and/or a wireless communication device (e.g., a UE) can associate a group identifier with at least one configuration parameter of at least one of uplink power control, timing advance (TA), transmission configuration indicator (TCI) state, spatial relation state, SRS resource indicator (SRI), channel state information (CSI) reporting configuration, triggering state of CSI reporting, triggering state for downlink reference signal, triggering state for uplink reference signal, slot format indicator, or window.

In some embodiments, the TCI state can be a container of the first group identifier, or can be joint coded with the first group identifier. In some embodiments, the SRI can be associated with the first group identifier, or can be joint coded with first group identifier. In some embodiments, the spatial relation state can be a container of the first group identifier, or can be joint coded with first group identifier. In some embodiments, the CSI reporting can include at least one of a CSI-RS resource indicator (CRI), synchronization signal or physical broadcast channel (SS/PBCH) indicator, precoding matrix indicator (PMI), channel quality indicator (CQI), rank indicator (RI) or layer indicator (LI), reference signal received power (RSRP) or signal-to-interference-plus-noise ratio (SINR). In some embodiments, a slot format entry or a group of slot format entries of the slot entry indicator can be associated with the first group identifier. In some embodiments, at least one of following can be supported: (a) configuration parameters of the window comprise at least one of a triggering offset, duration, pattern, or periodicity, (b) the window is applied with a scheduling restriction, (c) the window is applicable when time unit of the window corresponds to uplink or flexible formats, or (d) the window is triggered, by downlink control information (DCI), activated by a media access control control element (MAC-CE), or configured by radio resource control (RRC).

F. Signaling and Timeline for Group ID Indication

In some embodiments, a new MAC-CE or DCI signaling carrying the group ID can be introduced for activating or switching panel(s) associated with the group ID. Furthermore, in some embodiments, the new MAC-CE or DCI signaling can be used for DL, UL or both DL and UL transmission.

Timeline/UE behavior. In some embodiments, the timeline/UE behavior can be described in relation to the following scenario:

(a) At the time instant A, group ID indication or HARQ/ACK corresponding to the PDSCH carrying the activation command with group ID is transmitted.

(b) The transmission or reception of UL/DL signals (e.g., RS(s)/channel(s)) associated with old group ID(s) continues until A+X.

(b)(i) After A+X, the DL channel(s) is not received or monitored.

(b)(ii) After A+X, the UL channel(s), including CSI, is not transmitted.

(c) The transmission or reception of UL/DL RS(s)/channel(s) associated with new group ID(s) starts from A+Y.

(c)(i) From A+Y, the DL channel(s) is received or monitored.

(c)(ii) From A+Y, the UL channel(s), including CSI, is transmitted.

In the above scenario, X and Y are up to (based on, depend on) UE capability. Furthermore, in some embodiments, any suspended grant free (e.g., uplink grants of configured grant Type-1) associated with the active group ID(s) is initialized or re-initialized. Furthermore, in some embodiments, any grant free (e.g., uplink grant of configured grant Type 1) associated with inactive group ID(s) is suspended.

Joint coding between TCI and group ID for PDSCH: In some embodiments, the combination between TCI and group ID can be achieved by RRC and/or MAC-CE. Furthermore, in some embodiments, the TCI and group ID are separately selected from the pool of TCI and the pool of group IDs, respectively.

Joint coding between SRI/spatial relation and group ID for PUSCH: In some embodiments, the combination of SRI/spatial relation state and group ID can be achieved by RRC or MAC-CE. In some embodiments, the spatial relation state and the group ID can be separately selected from the pool of spatial relation state and the pool of group IDs, respectively. In some embodiments, the SRI state and the group ID can be separately selected from the pool of SRI states and the pool of group IDs, respectively.

In some embodiments, the group ID can be selected from one pool of group IDs, which can be configured by RRC/MAC-CE. In some embodiments, in order to guarantee or ensure the effectiveness of selecting or configuring group ID, DL or UL transmission capability to be supported, some options are summarized as follows.

Option 1: Only one panel can be activated at a time, with panel switching/activation delay of X ms (milliseconds), wherein X is a positive number.

Option 2: Multiple panels can be activated at a time, and one or more panels can be used for transmission. In some embodiments, this option can further be divided into three subcategories:
  (i) Option 2a: At a given time instant, one or more panels can be used for RS (e.g., SRS for beam management) transmission; but only one panel can be used for data and control channel transmission.
  (ii) Option 2b: At a given time instant, different panels can be used for transmission of respective signals, but only one panel can be used for one signal transmission.
  (iii) Option 2c: At a given time instant, one or more panels can be used for one transmission.

Option 3: Multiple panels can be activated at a time, but only one panel can be used for transmission.

In some embodiments, the panel-specific capability signaling can include (or be specified by, be described by) one or more of the following:
  (a) The number or maximum number of group IDs.
  (a)(i) The number or maximum number of group IDs for DL.
  (a)(ii) The number or maximum number of group IDs for UL.
  (a)(iii) The ratio of the number or maximum number of group IDs for UL over the number or maximum number of group IDs for DL.
  (b) The number or maximum number of active group IDs (e.g., for transmission of UL RS or channels).
  (b)(i) The number or maximum number of active group IDs for DL.
  (b)(ii) The number or maximum number of active group IDs for UL.
  (b)(iii) The ratio of the number or maximum number of active group IDs for UL over the number or maximum number of active group IDs for DL.
  (c) The latency of panel-switching.
  (c)(i) The latency of switching to inactive panel.
  (c)(ii) The latency of switching to active panel.

In some embodiments, a wireless communication node (e.g., a BS, a TRP, a gNB) and/or a wireless communication device (e.g., a UE) can transmit a message carrying a group identifier or a message carrying a hybrid automatic repeat request or acknowledgement (HARQ/ACK) corresponding to the message carrying the group identifier, at a first time A. In these embodiments, the wireless communication node and/or the wireless communication device can communicate the signals (e.g., RS(s) and/or channel(s)) between the wireless communication device and the wireless communication node at a second time B corresponding to a first time interval after A, and the signals are associated with the group identifier.

In some embodiments, the wireless communication node and/or the wireless communication device can communicate the signals between the wireless communication device and the wireless communication node until a third time C corresponding to a second time interval after A, wherein the first signals are associated with the first group identifier.

In some embodiments, the message can include a medium access control (MAC) control element or a control information signal. In some embodiments, the first time interval and the second time interval are determined according to a capability of the wireless communication device.

In some embodiments, a wireless communication node (e.g., a BS, a TRP, a gNB) and/or a wireless communication device (e.g., a UE) can communicate a message to indicate panel-specific capability, and the panel-specific capability can include at least one of: a number or maximum number of group identifiers, a number or maximum number of active group identifiers, or a latency of switching between communication panels.

G. Group ID Determination Rules for PDSCH and PUSCH

In some embodiments, from the UE's perspective, the PDSCH can be received according to its associated group ID. In some embodiments, besides explicit configuration for the PDSCH, the group ID for the PDSCH can be determined according to a CORESET. Furthermore, in some embodiments, the group ID associated with the PDSCH can be determined according to the scheduling CORESET. Furthermore, in some embodiments, the group ID associated with the PDSCH that has a scheduling offset<T (e.g., a threshold) can be determined according to the CORESET with the lowest ID in the latest slot.

In some embodiments, the PUSCH can be transmitted according to the group ID of other RS(s) or channel(s). Furthermore, in some embodiments, the group ID associated with the PUSCH can be determined according to the scheduling CORESET or the corresponding SRS. Furthermore, in some embodiments, the group ID associated with the PUSCH scheduled by the DCI format 0_0 can be determined according to the PUCCH resource with the lowest resource ID.

In some embodiments, for DL or UL channel or RS, the default group pattern can be configured by RRC, MAC-CE and/or DCI. In some embodiments, the pool of pattern of group ID(s) can be configured by RRC. In some embodiments, the MAC-CE and/or DCI can trigger or activate the pattern of group ID(s). Furthermore, in some embodiments, the default group pattern may be applicable only when the given slot is U (uplink) or Flexible-Formats. In other words, the UE ignores the pattern configuration when the given slot is D (downlink). In some embodiments, if the PDSCH is configured with a group ID or the scheduling offset of PDSCH is less than one threshold, the PDSCH can be received according to the default pattern.

Figure 6:
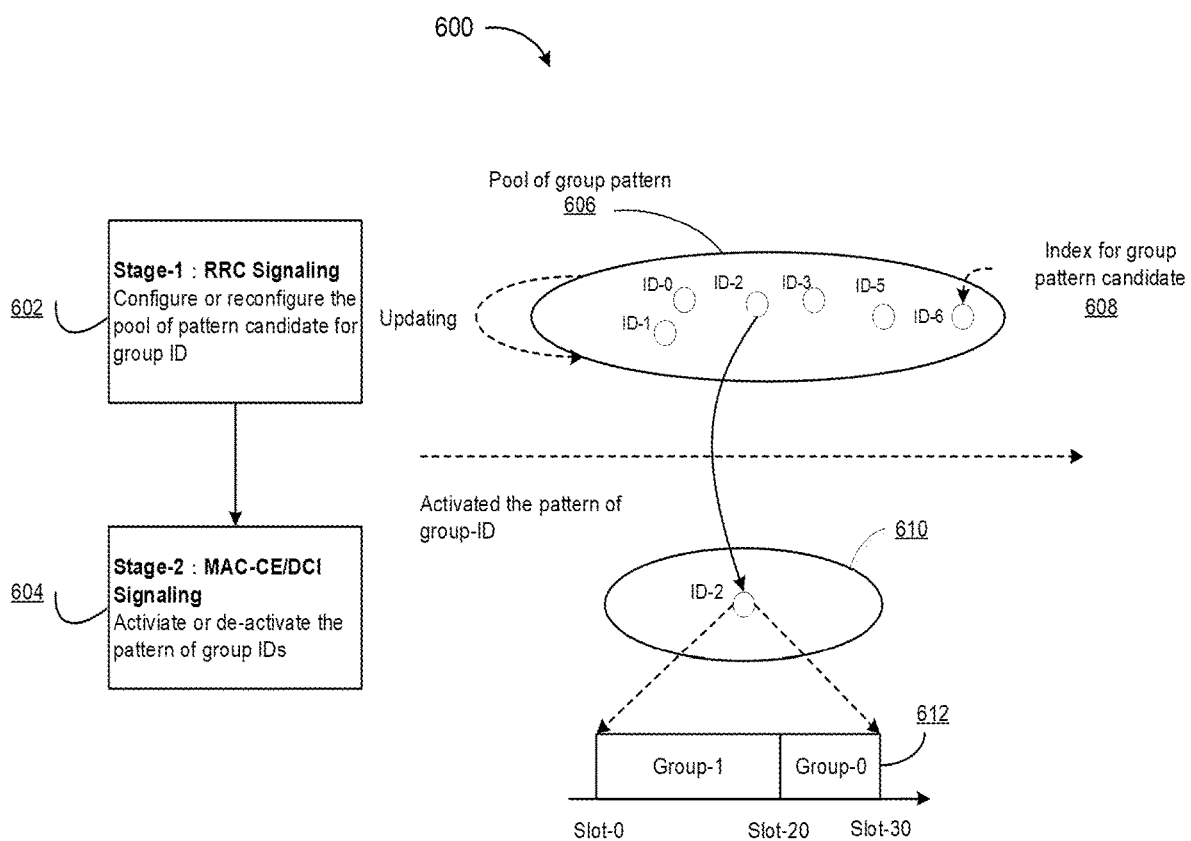
FIG. 6 illustrates an example process of default group pattern for physical downlink sharing channel (PDSCH) transmission, in accordance with some embodiments of the present disclosure.

One example for activation or deactivation of pattern of group ID(s) is illustrated in the FIG. 6. Referring to FIG. 6, an example procedure or process 600 of default group pattern for PDSCH transmission is shown, in accordance with some embodiments of the present disclosure. In some embodiments, RRC signaling can occur at Stage-1, where the process can include configuring or reconfiguring the pool of pattern candidate for group ID (block 602). For example, a wireless communication device (e.g., a UE) and/or a wireless communication node (e.g., a BS, a TRP, a gNB) can configure or reconfigure the pool of pattern candidate for group ID. As shown in FIG. 6, a pool of group pattern 606 (e.g., a pool of pattern of group ID(s)) can be configured by RRC. In the example in FIG. 6, the pool 606 includes 6 IDs (e.g., ID-1, ID-0, ID-2, ID-3, ID-5, D-6), where an index for group pattern candidate 608 is illustrated with respect to ID-6. In some embodiments, the pool 606 can be updated for configuration or re-configuration.

In some embodiments, MAC-CE/DCI signaling can occur at Stage-2, where the process can include activating or de-activating the pattern of group IDs (bock 604). For example, a wireless communication device (e.g., a UE) and/or a wireless communication node (e.g., a BS, a TRP, a gNB) can activate or de-activate the pattern of group IDs. For example, as shown in FIG. 6, in ID-2 610, the pattern of group ID is Group-1 with 20 slots+Group-0 with 10 slots, as illustrate by block 612. In some embodiments, a wireless communication device (e.g., a UE) and/or a wireless communication node (e.g., a BS, a TRP, a gNB) can determine, identify, or detect a group identifier according to a control resource set. In some embodiments, a wireless communication device (e.g., a UE) and/or a wireless communication node (e.g., a BS, a TRP, a gNB) can determine, identify, or detect a group identifier according to a scheduling control resource set or a corresponding sounding reference signal. In some embodiments, the group identifier can be associated with a shared channel (e.g., PDSCH, PUSCH).

In some embodiments, a wireless communication device (e.g., a UE) and/or a wireless communication node (e.g., a BS, a TRP, a gNB) can determine, identify, or detect a group identifier according to a control resource set with a lowest identifier in a latest slot. In some embodiments, the group identifier can be associated with a shared channel (e.g., PDSCH, PUSCH) having a scheduling offset less than a defined threshold.

In some embodiments, a wireless communication device (e.g., a UE) and/or a wireless communication node (e.g., a BS, a TRP, a gNB) can determine, identify, or detect a group identifier according to a resource of a control channel with a lowest resource identifier. In some embodiments, the control channel is scheduled by control information with a defined format.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller.

Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method comprising:
    determining that a first signal to be communicated between a wireless communication device and a wireless communication node, is associated with a first group identifier that is determined according to a first control resource set (CORESET) and is associated with a first timing advance (TA) and a first transmission configuration indicator (TCI) state;
    determining that a second signal to be communicated between the wireless communication device and the wireless communication node is associated with a second group identifier that is determined according to a second CORESET different from the first CORESET, and is associated with a second TA different from the first TA, and associated with a second TCI state different from the first TCI state, wherein the second group identifier is different from the first group identifier; and
    determining, responsive to determining that the first signal is associated with the first group identifier and the second signal is associated with the second group identifier, to communicate the first signal and the second signal simultaneously between the wireless communication device and the wireless communication node.

2. The method of claim 1, wherein the wireless communication device comprises a plurality of communications panels each associated with a respective group identifier, and wherein only one of the plurality of communications panels is configured to be activated at a time.

3. The method of claim 1, wherein the wireless communication device comprises a plurality of communications panels each associated with a respective group identifier, and wherein one or more of the plurality of communications-panels are configured to be activated at a time.

4. The method of claim 3, wherein only one of the plurality of communications panels is configured for communication between the wireless communication device and the wireless communication node at a time.

5. The method of claim 1, wherein the first group identifier is among a plurality of group identifiers, the method further comprising:
    determining, by the wireless communication node, for each of the plurality of group identifiers, a corresponding field size according to a capability of the wireless communication device.

6. The method of claim 1, wherein the first group identifier is among a plurality of group identifiers for downlink communication, the method further comprising:
    associating at least one group identifier of the plurality of group identifiers for downlink communication, with at least one group identifier for uplink communication, the at least one other group identifier different from the plurality of group identifiers.

7. The method of claim 6, wherein the plurality of group identifiers can be grouped into one or more sets including a first set for downlink communication, and wherein the first set can be associated with a group identifier for uplink communications or a set of group identifiers for uplink communications.

8. A wireless communication device, comprising:
    a memory; and
    at least one processor configured to:
        determine that a first signal to be communicated between the wireless communication device and a wireless communication node is associated with a first group identifier that is determined according to a first control resource set (CORESET) and is associated with a first timing advance (TA) and a first transmission configuration indicator (TCI) state;
        determine that a second signal to be communicated between the wireless communication device and the wireless communication node is associated with a second group identifier that is determined according to a second CORESET different from the first CORESET, and is associated with a second TA different from the first TA, and associated with a second TCI state different from the first TCI state, wherein the second group identifier is different from the first group identifier; and
        determine, responsive to determining that the first signal is associated with the first group identifier and the second signal is associated with the second group identifier, to communicate the first signal and the second signal simultaneously between the wireless communication device and the wireless communication node.

9. The wireless communication device of claim 8 comprises a plurality of communications panels each associated with a respective group identifier, and wherein only one of the plurality of communications panels is configured to be activated at a time.

10. The wireless communication device of claim 8 comprises a plurality of communications panels each associated with a respective group identifier, and wherein one or more of the plurality of communications-panels are configured to be activated at a time.

11. The wireless communication device of claim 10, wherein only one of the plurality of communications panels is configured for communication between the wireless communication device and the wireless communication node at a time.

12. The wireless communication device of claim 8, wherein the first group identifier is among a plurality of group identifiers for downlink communication, and wherein at least one group identifier of the plurality of group identifiers is associated for downlink communication, and at least one group identifier is associated for uplink communication.

13. The wireless communication device of claim 12, wherein the plurality of group identifiers are grouped into one or more sets including a first set for downlink communication, and wherein the first set is associated with a group identifier for uplink communications or a set of group identifiers for uplink communications.

14. A wireless communication node, comprising:
    a memory; and
    at least one processor configured to:
        determining that a first signal to be communicated between a wireless communication device and a wireless communication node, is associated with a first group identifier that is determined according to a first control resource set (CORESET) and is associated with a first timing advance (TA) and a first transmission configuration indicator (TCI) state;

determining that a second signal to be communicated between the wireless communication device and the wireless communication node is associated with a second group identifier that is determined according to a second CORESET different from the first CORESET, and is associated with a second TA different from the first TA, and associated with a second TCI state different from the first TCI state, wherein the second group identifier is different from the first group identifier; and determining, responsive to determining that the first signal is associated with the first group identifier and the second signal is associated with the second group identifier, to communicate the first signal and the second signal simultaneously between the wireless communication device and the wireless communication node.

15. The wireless communication node of claim 14, wherein the first group identifier is among a plurality of group identifiers, the one or more processors are configured to:
 determine, for each of the plurality of group identifiers, a corresponding bit size according to a capability of the wireless communication device.

16. The wireless communication node of claim 14, wherein the first group identifier is among a plurality of group identifiers for downlink communication, and wherein at least one group identifier of the plurality of group identifiers is associated for downlink communication, and at least one group identifier is associated for uplink communication.

17. The wireless communication device of claim 14, wherein the plurality of group identifiers are grouped into one or more sets including a first set for downlink communication, and wherein the first set is associated with a group identifier for uplink communications or a set of group identifiers for uplink communications.

* * * * *